Beverly E. Williams
and Leon L. Cadwell
Inventor

By Roy W. Johns
Attorney

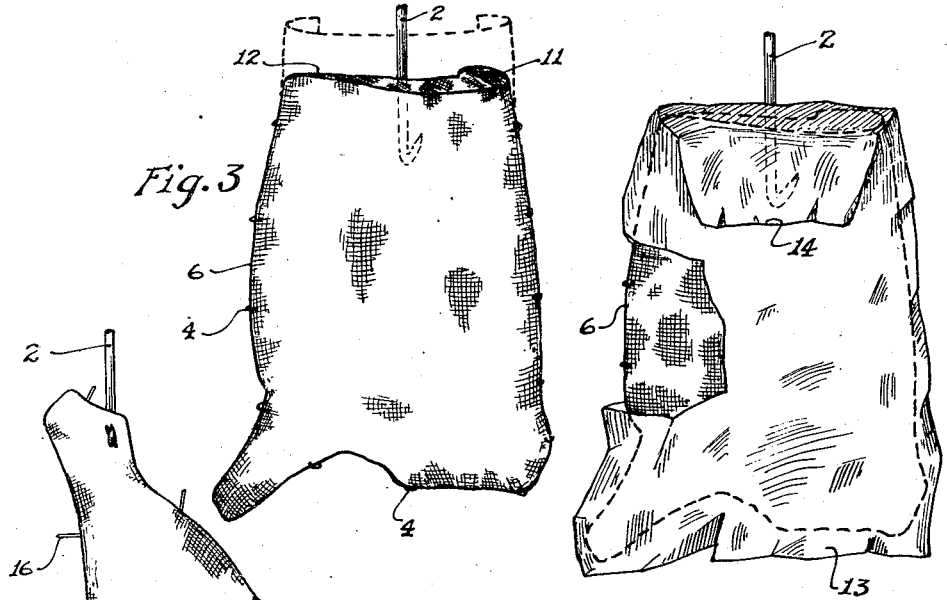
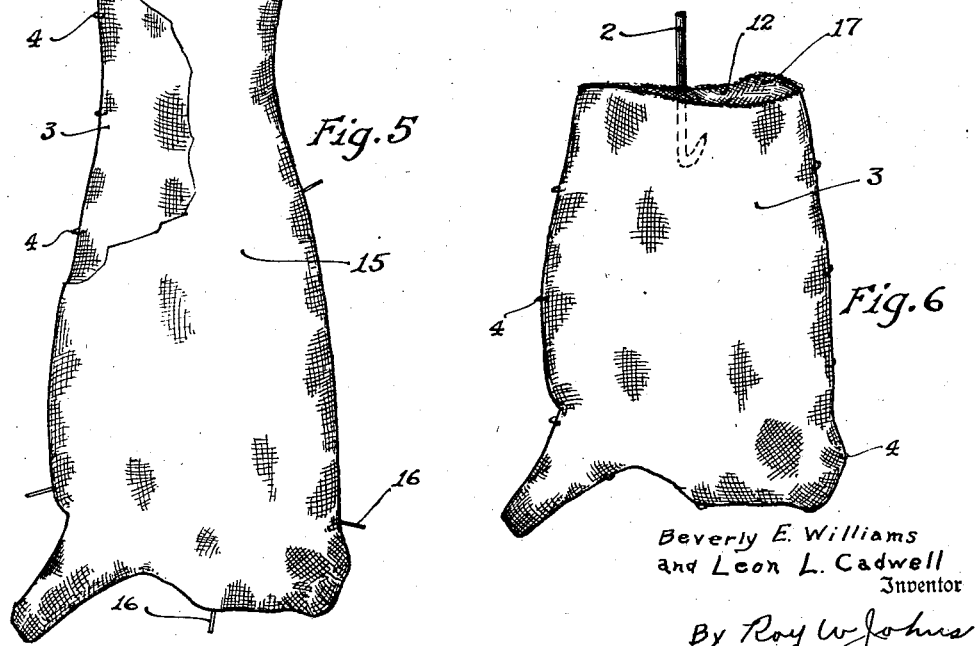

Patented Oct. 21, 1941

2,259,868

UNITED STATES PATENT OFFICE 2,259,868

TREATMENT OF BEEF CARCASSES

Beverly E. Williams and Leon L. Cadwell, Chicago, Ill., assignors to Swift and Company, Chicago, Ill., a corporation of Illinois Application November 21, 1938, Serial No. 241,710

7 Claims. (Cl. 99—157)

This invention relates to the treatment of beef carcasses.

One of the objects of the invention is to provide an improved method of dressing beef carcasses.

Another object of the invention is to provide a method of packaging carcass beef including sides, quarters and wholesale cuts.

Another object of the invention is to provide a method for preserving the condition and appearance of cut surfaces of beef.

Other objects of the invention will be apparent from the description and claims which follow.

This application is in part a continuation of our application entitled Treatment of beef carcasses, Serial No. 152,154, filed July 6, 1937.

In preparing beef for market in an abattoir or packing house, it is the usual practice to drive the beef animal into a pen or stall. The animal is stunned by a hammer blow on the pate. The stunned animal is rolled from the pen, shackled by the hind legs and raised from the floor, whereupon the throat is cut. The carcass of beef is then moved from the bleeding pits to the skinning floor where the hide is removed. As the dressing process proceeds, the entrails are removed and the carcass split into two sides by a cut the entire length of the animal through the center of the backbone.

Much of the outer surface of a side of beef is covered with a layer of fat which often presents a lumpy appearance. It has been proposed in the patent to Murphy, No. 1,506,599, to treat a dressed beef carcass by stretching muslin which has been soaked in warm salt brine, as tightly as possible over the outside of the carcass attaching it to the carcass by steel pins. The carcass is then transferred to a cooler and after about twelve to twenty-four hours the muslin is removed. It is said that this treatment smoothes and bleaches the fat.

However, whether or not a side of beef is covered with the muslin soaked in warm salt brine, it is placed in a cooler to remove the animal heat. The cooler is a refrigerated room held at refrigerating temperatures ordinarily about 33° to 35° Fahrenheit. After the side of beef has been chilled, it is cut into the conventional quarters of the trade, exposing the eye of the rib at the cut end of each quarter. If the side has been shrouded in accordance with the teachings of Murphy, quartering does not occur until after removal of the shroud.

It is unusual to ship or to market beef in sides because the grade of beef, and consequently its value, is determined largely by observation of the cut eye of the rib. Some quarters of beef are further divided into wholesale cuts which vary depending upon the demands of the trade. The bulk of the beef production is shipped from the packing house in the form of quarters. The better grades of beef are wrapped in paper and in some cases the paper is held in place by a very loosely woven net fabric bag.

In our patent entitled Treatment of Calves, No. 2,076,053, we described and claimed a new process for the treatment of calves.

The present invention is directed to beef and affords a new departure in the handling of beef carcasses and wholesale portions thereof, and is of particular utility in the shipping and holding of quartered beef, providing a new and simple method whereby the bloom of the cut surfaces may be preserved without resort to the complicated and unsatisfactory pastes and coatings of the prior art.

Attention is called to the drawings in which similar reference characters in the several figures indicate identical elements.

Figure 3 is a side view of the forequarter of the side of beef shown in Figure 2 with the cloth in place.

Figure 4 is a side view, partly in section, of the forequarter shown in Figure 3 which has been covered with a paper bag.

Figure 5 is a side view of a side of beef similar to that shown in Figure 1 but having a second shroud.

Figure 6 is a view of a forequarter of beef such as is shown in Figures 1 and 5 but having the second shroud of Figure 5 removed and having a cloth applied to the cut surface.

Figures 1, 2:
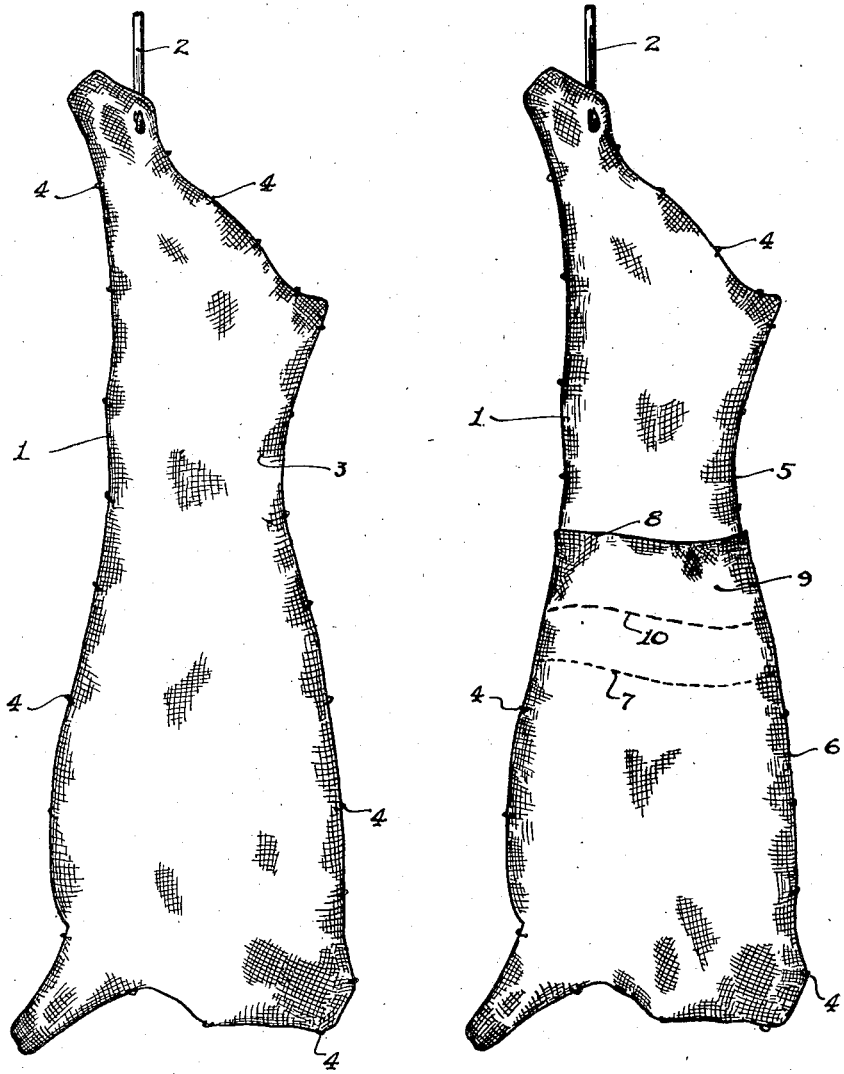
Figure 1 is a side view of a clothed side of beef suspended from a hook.
Figure 2 is a side view of a clothed side of beef which has been provided with two separate cloths having an overlap.

In carrying out the broad aspects of the present invention, the beef carcass 1, which is preferably suspended from a suspension means such as 2, is covered with a cloth 3 prepared from beef sheeting. A satisfactory one-piece shroud may be prepared from a piece of muslin or beef sheeting 36 inches by 90 inches in size. Before application to the beef carcass, the shroud is moistened with a preservative, preferably a sodium chloride water solution from 5° to 20° salometer reading strength. A satisfactory procedure is to soak the cloths in a centrifugal wringer resulting in a lightly brine moistened cloth. The cloth is then tightly and smoothly applied to the skinned surfaces of the beef side and fastened by such means as pins, sewed string stitches, or string ties.

In the example shown in Figure 1, the cloth is held in place as by stitches 4, some of which are not visible.

In the example shown in Figure 2, the side is covered by lightly brine moistened hind quarter shroud 5 and lightly brine moistened forequarter shroud 6. A satisfactory hind quarter or forequarter shroud may be prepared from a piece of muslin, a beef sheeting 36 inches by 52 inches in size.

It will be noted that the end of the hind quarter shroud is shown by dotted line 7, forequarter shroud 6 ends at line 8 forming an overlap 9 centered at about ribbing line 10.

When it is desired to quarter the side, the forequarter shroud and hind quarter shroud are loosened at the overlap and the side of beef exposed to permit a cut at the ribbing line to divide the side into conventional quarters, such as is shown in Figure 3. In the further treatment of the forequarter shown in Figure 3, the overlap 11 of forequarter shroud 6 is folded down in contact with the cut surface 12 and held in place by any suitable means after which the clothed quarter is placed in a paper bag or other outer covering, which may be a crinkled paper bag such as a kraft bag 13, as shown in Figure 4, which is closed in any suitable manner as at 14.

We have found that a satisfactory treatment may employ two cloths 3 and 15 as shown in Figure 5. Cloth 3 is held in place as by stitches 4. In this instance the second cloth 15 similar to the cloth 3 of Figure 1, is placed over cloth 3 and removably affixed as by skewers 16. Before ribbing, cloth 15 is removed. After ribbing, the eye of the rib 12 is covered with a lightly brine moistened cloth 17, as shown in Figure 6. The cloth may be held in place by a bag such as bag 13 or may be tacked in place by stitches or other means.

The procedure which is illustrated in Figure 5 has been found in practice to be effective in securing the benefits of the present invention and to assure that the first cloth or shroud will not become blood stained or soiled with serum or other liquid absorbed from the surface of the meat.

The preferred procedure in carrying out this embodiment of the invention is to apply the first shroud in a relatively permanent manner as by the employment of stitches and the like, the first shroud being preferably applied on the killing floor immediately after the hide has been removed and the carcass has been split into sides. The second shroud is applied immediately after the application of the first but is temporarily affixed as by pins. Beef carcasses are conventionally skinned while hot. The blood vessels, which pass through the fatty layer and nourish the hide, are ruptured upon removal of the hide, causing blood spots on the skinned surface. These blood spots may be removed by washing. However, it is obvious that if a shroud is applied a further seepage of blood from the capillaries and small blood vessels will occur after the application of the shroud. We have found that capillary action causes the blood to come to the surface of the shroud, where, if but a single shroud is used, the blood dries and unsightly blood spots appear. We have found that the second shroud acts as a blotter whereby the capillary action carries the blood to the surface of the second shroud which upon removal carries with it the unsightly blood spots, eliminating the necessity of removing the original shroud and reclothing with a brine soaked cloth before bagging.

For two generations the attention of the beef industry has been directed to the problem of preserving the natural bloom of a freshly dressed carcass, and the natural bloom and appearance of a freshly cut surface of beef. Divers strange concoctions have been developed from time to time but have not been adopted by the industry either by reason of expense or by reason of failure of the coating in question to perform its desired function.

We have discovered that the simple application of a lightly brine moistened cloth to the cut surface and the covering of the cut of beef or quarter with a humidor bag substantially impervious to atmospheric moisture, brings about a remarkable result in the preservation of cut surfaces during refrigerated storage or shipping. The wick or blotter action of the damp cloth acting within the humidor prevents surface drying of the cut. The method of the present invention provides a nice balance between the absorption of moisture from the surface by the fabric and the inhibition of moisture loss by the humidor effect of the outer bag.

Many tests of the effectiveness of the present invention have been made. It has been found that the method of the present invention brings about results which are peculiar to beef in providing a sanitary package which is a further assurance of wholesome meat, reduces shrinkage and trimming losses and preserves the appearance and condition of the product.

We claim:

1. The method of packaging beef quarters which comprises applying a brine moistened forequarter shroud and a brine moistened hind quarter shroud to the beef side, said shrouds being of such length as to form an overlap whereby the overlapping ends of each shroud extending beyond the ribbing line, permitting the shrouds to remain in place until the animal heat has been dissipated and thereafter ribbing down the sides, covering the cut surface of each quarter with the overlap of the shroud and enclosing the shrouded quarter in a humidor wrapper.

2. The method of treating fresh beef which comprises applying a brine moistened cloth to the skinned surface of the beef, applying a second cloth over and in intimate contact with the first cloth, dissipating the animal heat of the double shrouded beef, thereafter removing the lastly applied cloth and enclosing the clothed beef in a wrapper substantially impervious to atmospheric moisture.

3. The method of treating beef which comprises covering the skinned surface with a brine moistened shroud, applying a second shroud over and in intimate contact with the first shroud, removing the second shroud after the animal heat has been dissipated, and thereafter enclosing the clothed beef in a wrapper substantially impervious to atmospheric moisture.

4. In the dressing of beef carcasses, the steps which comprise applying a brine moistened cloth to the freshly skinned surface of the beef, applying a second cloth over and in intimate contact with the first cloth, whereby blood and moisture pass through the first cloth to the second cloth, dissipating the animal heat of the double shrouded beef, thereafter removing the lastly applied cloth and protecting the clothed beef against evaporation.

5. The method of treating fresh beef preparatory for shipment which comprises applying a brine moistened cloth to the freshly skinned surface of the beef, applying a second shroud over and in intimate contact with the first cloth, dissipating the animal heat of the double shrouded beef, permitting blood and moisture to pass through the first cloth to the second cloth, removing the lastly applied cloth and thereafter protecting the shrouded product against evaporation.

6. In the handling of beef carcasses and wholesale cuts thereof, wherein the freshly skinned surface of beef is covered with a brine moistened cloth, the animal heat removed, and the clothed product enclosed in a humidor wrapper, the improvement which comprises applying a second cloth over and in intimate contact with the first cloth whereby the blood and moisture pass through the first cloth to the second cloth and removing said second cloth prior to applying said wrapper.

7. The method of treating fresh beef sides which comprises covering the skinned surface with a brine moistened shroud, applying a second shroud over and in intimate contact with the first shroud, removing the second shroud after the animal heat has been dissipated, ribbing the side into quarters, applying to the freshly cut surface a protective covering and protecting the shrouded product against evaporation.

BEVERLY E. WILLIAMS.
LEON L. CADWELL.